(12) United States Patent
Kurokawa et al.

(10) Patent No.: US 11,952,000 B2
(45) Date of Patent: Apr. 9, 2024

(54) VEHICLE FAILURE DIAGNOSTIC DEVICE

(71) Applicant: Mazda Motor Corporation, Hiroshima (JP)

(72) Inventors: Yoshimasa Kurokawa, Hiroshima (JP); Tetsuhiro Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 378 days.

(21) Appl. No.: 17/616,186

(22) PCT Filed: Mar. 13, 2020

(86) PCT No.: PCT/JP2020/011255
§ 371 (c)(1),
(2) Date: Dec. 3, 2021

(87) PCT Pub. No.: WO2020/246102
PCT Pub. Date: Dec. 10, 2020

(65) Prior Publication Data
US 2022/0242426 A1 Aug. 4, 2022

(30) Foreign Application Priority Data
Jun. 6, 2019 (JP) ................................. 2019-106425

(51) Int. Cl.
*B60W 50/02* (2012.01)
*G07C 5/08* (2006.01)
*B60W 60/00* (2020.01)

(52) U.S. Cl.
CPC .... *B60W 50/0225* (2013.01); *B60W 50/0205* (2013.01); *G07C 5/0808* (2013.01); *B60W 2050/0215* (2013.01); *B60W 60/0015* (2020.02)

(58) Field of Classification Search
CPC ......... B60W 50/0225; B60W 50/0205; B60W 60/0015; B60W 2050/0215; G07C 5/0808
See application file for complete search history.

(56) References Cited

U.S. PATENT DOCUMENTS

2006/0015231 A1* 1/2006 Yoshimura ............ B60L 3/0076
701/1
2017/0169627 A1* 6/2017 Kim ...................... G01S 13/862
(Continued)

FOREIGN PATENT DOCUMENTS

JP 3912218 B2 5/2007

OTHER PUBLICATIONS

International Search Report and Written Opinion dated Jun. 2, 2020, received for PCT Application PCT/JP2020/011255, Filed on Mar. 13, 2020, 8 pages including English Translation.

*Primary Examiner* — Calvin Cheung
(74) *Attorney, Agent, or Firm* — XSENSUS LLP

(57) ABSTRACT

The present disclosure includes device controllers that output control signals to in-vehicle devices based on a target motion set by a target motion setter based on input from the sensors, and a device failure diagnostic unit provided between the device controllers and the in-vehicle devices in a communication path of an arithmetic unit, in which the device failure diagnostic unit has a device diagnostic table in which the in-vehicle devices associated with each function are specified for each function of the vehicle, and diagnoses a failure of the in-vehicle devices based on output of the in-vehicle devices and the device diagnostic table.

8 Claims, 4 Drawing Sheets

(56) References Cited

U.S. PATENT DOCUMENTS

| | | | |
|---|---|---|---|
| 2018/0040171 A1* | 2/2018 | Kundu | G07C 5/008 |
| 2018/0050704 A1* | 2/2018 | Tascione | B60W 10/184 |
| 2019/0049958 A1* | 2/2019 | Liu | G01S 17/00 |
| 2020/0125441 A1* | 4/2020 | Omori | B60R 16/02 |

* cited by examiner

FIG.3

| CODE | INJECTOR | IGNITION PLUG | THROTTLE VALVE | ... |
|---|---|---|---|---|
| D1 | ○ | ○ | × | ... |
| D2 | × | ○ | ○ | ... |
| D3 | × | × | ○ | ... |
| ... | ... | ... | ... | ... |

| CODE | AIRFLOW SENSOR | ACCELERATION OPENING DEGREE SENSOR | CRANK ANGLE SENSOR | ... |
|---|---|---|---|---|
| A1 | ○ | ○ | × | ... |
| A2 | ○ | × | ○ | ... |
| A3 | ○ | × | × | ... |
| ... | ... | ... | ... | ... |

161

VEHICLE FAILURE DIAGNOSTIC DEVICE

CROSS-REFERENCE TO RELATED APPLICATIONS

The present application is based on PCT filing PCT/JP2020/011255, filed Mar. 13, 2020, which claims priority to JP 2019-106425, filed Jun. 6, 2019, the entire contents of each are incorporated herein by reference.

TECHNICAL FIELD

A technique disclosed herein belongs to a technical field relating to vehicle failure diagnostic devices.

BACKGROUND ART

Recently, vehicles have been computerized, and in-vehicle devices have been controlled by outputting control signals to an engine, an automatic transmission, a brake, and the like. In such a computerized vehicle, an electric signal is used for a failure of a communication network of the control signals and a failure of the in-vehicle devices themselves (for example, Patent Document 1).

For example, Patent Document 1 discloses a vehicle communication system configured to store a route table in which a transmission route until important data is received by various ECUs is written in a manager ECU connected to all communication lines of the various ECUs, and detect an abnormality in the transmission route from data flowing through the communication lines using the route table.

CITATION LIST

Patent Document

Patent Document 1: Japanese Patent No. 3912218

SUMMARY OF THE INVENTION

Technical Problem

In an existing vehicle failure diagnosis, a failure code indicating a failure is assigned to each sensor and each in-vehicle device, and an operator such as a dealer who recognizes the failure of the vehicle reads each failure code to find a location of the failure of the vehicle. However, when a plurality of sensors or a plurality of in-vehicle devices is associated with an event that seems to be a vehicle failure, it is difficult to clearly find a final cause of the event.

For example, the engine, the transmission, the brake device, or the like is involved in an event in which wheel torque does not occur. However, with the individual failure code alone, it is difficult to find which in-vehicle device is failing and, making it difficult to find the cause of the event.

The technique disclosed herein has been made in view of these points, and its purpose is to make it easy to find a cause when an event that seems to be a failure of the vehicle occurs.

Solution to the Problems

In order to solve the above problems, the technique disclosed herein is intended for a vehicle failure diagnostic device provided with an arithmetic unit that performs a calculation for controlling in-vehicle devices mounted in a vehicle, and includes a plurality of sensors that inputs vehicle information including an exterior environment of the vehicle to the arithmetic unit, a target motion setter that is provided in the arithmetic unit and sets a target motion of the vehicle based on the information input by the plurality of sensors, a device controller provided in the arithmetic unit and outputting a control signal to each of the in-vehicle devices based on the target motion set by the target motion setter, and a device failure diagnostic unit that is provided between the device controller and the in-vehicle devices in a communication path of the arithmetic unit and diagnoses a failure of the in-vehicle devices, in which the device failure diagnostic unit has a device diagnostic table in which the in-vehicle devices associated with each function are specified for each function of the vehicle, and diagnoses a failure of the in-vehicle devices based on output of the in-vehicle devices and the device diagnostic table.

In this configuration, the device failure diagnostic unit is provided between the device controllers and the in-vehicle devices in the communication path of the arithmetic unit, and thus the device failure diagnostic unit receives output from the device controllers that control the in-vehicle devices. Thus, the device failure diagnostic unit can diagnose the failure of the in-vehicle devices in consideration of association of the in-vehicle devices. Then, the device failure diagnostic unit has a device diagnostic table in which the in-vehicle devices associated with the functions are specified for each function of the vehicle, and thus when an event that seems to be a failure occurs in the vehicle, the device failure diagnostic unit can find a status of the in-vehicle devices associated with the event. This makes it easy to find a cause of an event that seems to be a vehicle failure.

In the vehicle failure diagnostic device, the target motion setter has a route determiner that determines a traveling route on which the vehicle is to travel based on output of the plurality of sensors, a vehicle motion determiner that determines a motion of the vehicle for following the traveling route calculated by the route determiner, and the device failure diagnostic unit diagnoses the failure of the in-vehicle devices by further considering the traveling route determined by the route determiner and the motion of the vehicle determined by the vehicle motion determiner.

For example, in an event in which an engine is rotating but the vehicle does not move forward, a road surface condition of the traveling route (for example, the road surface is frozen) and the motion of the vehicle on the road surface condition are considered, and then the device failure diagnostic unit can determine that the problem is not a failure of the in-vehicle devices but the road surface condition. This makes it easy to find a cause of an event that seems to be a vehicle failure.

The vehicle failure diagnostic device further includes a sensor failure diagnostic unit provided between the plurality of sensors and the target motion setter in the communication path of the arithmetic unit and configured to diagnose a failure of the plurality of sensors, in which the sensor failure diagnostic unit has a sensor diagnostic table in which the plurality of sensors associated with each function is specified for each function of the vehicle, and diagnoses the failure of the plurality of sensors based on the sensor diagnostic table.

In this configuration, when an event that seems to be a failure occurs in the vehicle, it is easy to identify a cause of the event even if the failure is not in an in-vehicle device but a sensor. This makes it easy to find a cause of an event that seems to be a vehicle failure.

The vehicle failure diagnostic device further includes a memory section configured to store a diagnosis result of the device failure diagnostic unit and a diagnosis result of the sensor failure diagnostic unit in association with each function of the vehicle.

This configuration makes it possible to diagnose the failure of the vehicle after finding the combination of the in-vehicle device and the sensor associated with the function of the vehicle. This makes it easy to find a cause of an event that seems to be a vehicle failure.

In the vehicle failure diagnostic device provided with the memory section, the target motion setter has a route determiner that determines a traveling route on which the vehicle is to travel based on output of the plurality of sensors, a vehicle motion determiner that determines a motion of the vehicle for following the traveling route calculated by the route determiner, and the memory section stores the traveling route determined by the route determiner and the motion of the vehicle determined by the vehicle motion determiner in association with the diagnosis result of the device failure diagnostic unit and the diagnosis result of the sensor failure diagnostic unit.

In this configuration, the traveling route and the target motion of the vehicle are further considered in the failure diagnosis of the vehicle. As a result, for example, in an event in which the engine is rotating but the vehicle does not move forward, the road surface condition of the traveling route (for example, the road surface is frozen) and the motion of the vehicle on the road surface condition are considered. It can therefore be understood that the problem is not a failure of the in-vehicle devices or the sensors but the road surface condition. This makes it easy to find a cause of an event that seems to be a vehicle failure.

Advantages of the Invention

As described above, the technique disclosed herein makes it easy to find a cause when an event that seems to be a vehicle failure occurs.

BRIEF DESCRIPTION OF THE DRAWINGS

FIG. 3 is a diagram showing an example of a device diagnostic table stored in a device failure diagnostic unit.

FIG. 4 is a diagram showing an example of a sensor diagnostic table stored in a sensor failure diagnostic unit.

DESCRIPTION OF EMBODIMENTS

An exemplary embodiment will now be described in detail with reference to the drawings.

Figure 1:
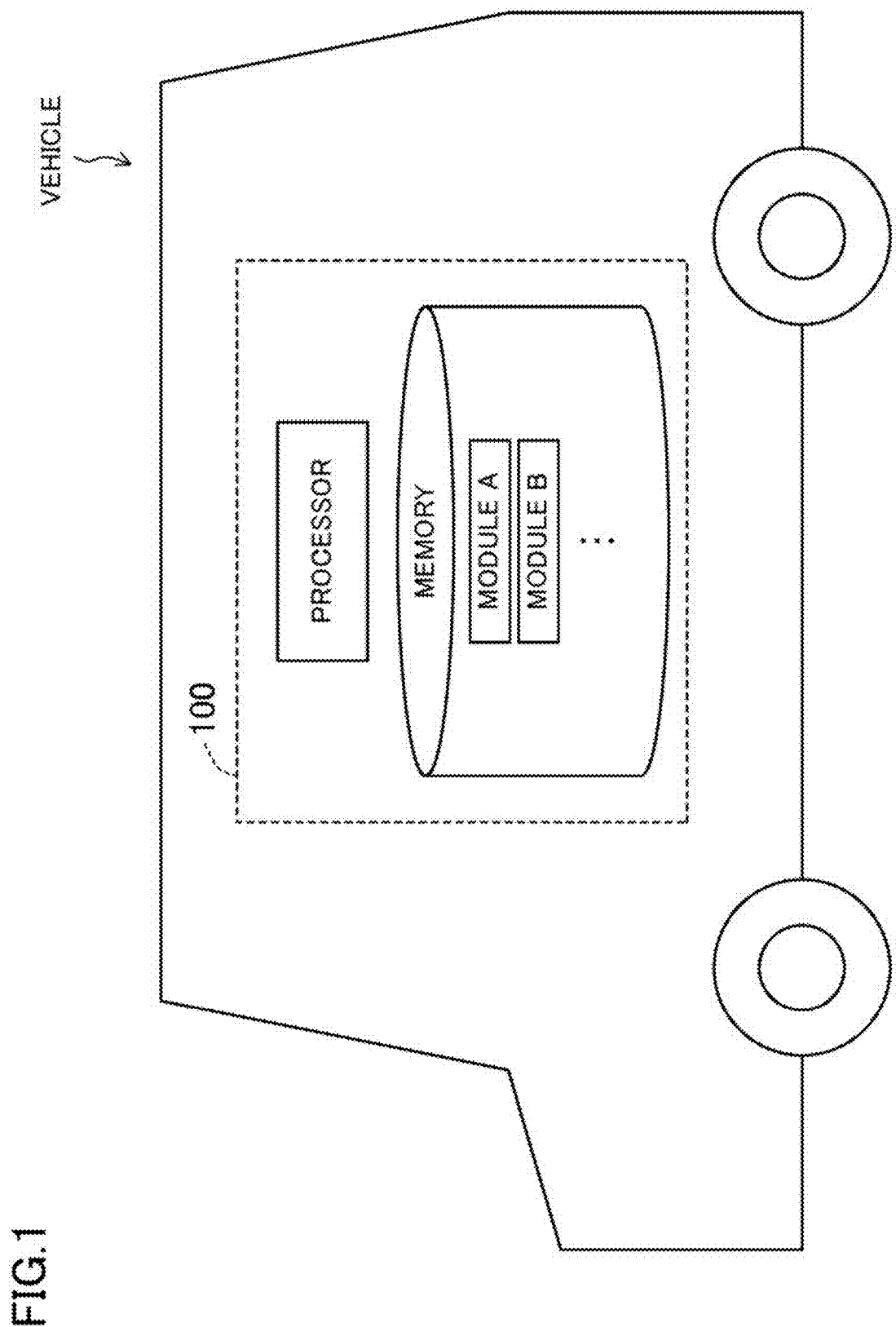
FIG. 1 is a schematic view showing a vehicle equipped with an arithmetic unit including a failure diagnostic device of an exemplary embodiment.

FIG. 1 schematically shows a vehicle equipped with an arithmetic unit 100 according to a first embodiment. The arithmetic unit 100 has a function of calculating a route on which the vehicle is to travel and determining a motion of the vehicle for following the route in order to enable assisted driving and autonomous driving of the vehicle.

The arithmetic unit 100 is computer hardware having at least one chip, and specifically, has a processor having a CPU, a memory storing a plurality of modules, and the like.

Figure 2:
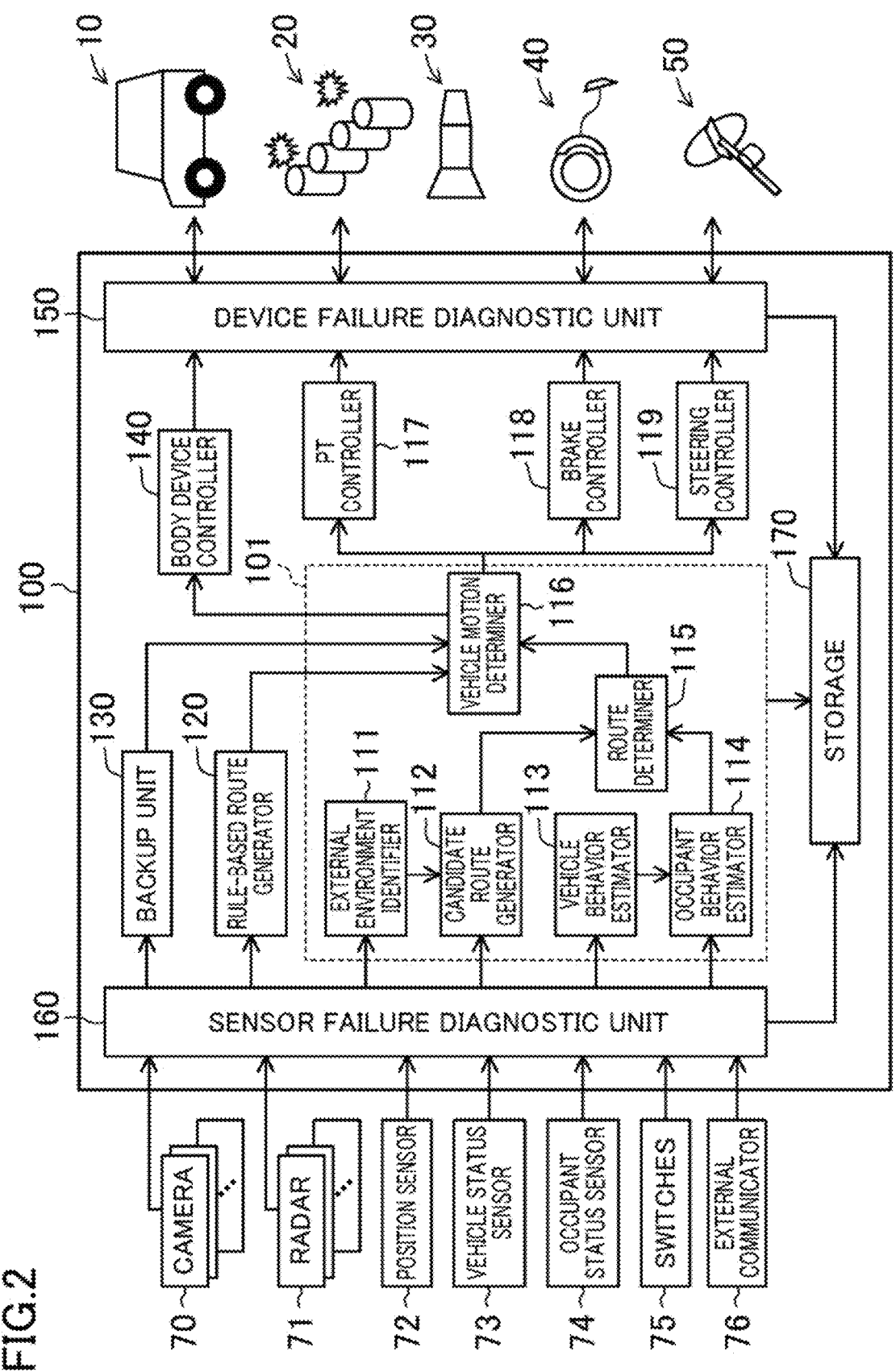
FIG. 2 is a schematic view showing the arithmetic unit including the failure diagnostic device.

FIG. 2 schematically shows a configuration of the arithmetic unit 100 mounted in the vehicle. Here, among configurations of the arithmetic unit 100, the configuration for exerting a function (route generation function described later) according to the present embodiment is shown, and not all the functions of the arithmetic unit 100 are shown.

As shown in FIG. 2, the arithmetic unit 100 determines a target motion of the vehicle based on information input from a plurality of sensors and the like that input vehicle information including exterior environment of the vehicle, and controls operations of devices. Sensors and the like that output information to the arithmetic unit 100 include a plurality of cameras 70 that is provided on a body of the vehicle and the like and captures images of the exterior environment, a plurality of radars 71 that is provided on a body and the like of the vehicle and detects a target outside the vehicle, a position sensor 72 that detects a position of the vehicle (vehicle position information) using a global positioning system (GPS), a vehicle status sensor 73 that is configured by output of sensors detecting a vehicle behavior and acquires a vehicle status, sensors that detect the behavior of the vehicle, such as a vehicle speed sensor, an acceleration sensor, and a yaw rate sensor, an occupant status sensor 74 that is configured by an in-vehicle camera and the like and acquires a status of an occupant of the vehicle, switches 75 that activate a headlight and an air conditioner, and an external communicator 76 that receives communication information from another vehicle located around the own vehicle and traffic information from a navigation system and inputs the information to the arithmetic unit 100.

The cameras 70 are arranged to image the surroundings of the vehicle at 360° in the horizontal direction. The cameras 70 capture optical images showing the exterior environment and generate image data. Each camera 70 outputs the generated image data to the arithmetic unit 100.

The image data acquired by the cameras 70 is input to a human machine interface (HMI) unit (not shown) in addition to the arithmetic unit 100. This HMI unit displays information based on the acquired image data on a display or the like in the vehicle.

The radars 71 are arranged so that the detection range covers 360° of the vehicle in the horizontal direction, similarly to the cameras 70. A type of the radars 71 is not limited, and for example, millimeter wave radars or infrared radars can be adopted.

The arithmetic unit 100 has a target motion setter 101 that sets a traveling route of the vehicle based on the information input from the sensors 70 to 76 and sets the target motion of the vehicle such that the vehicle follows the traveling route during assisted driving or autonomous driving. In order to set the target motion of the vehicle, the target motion setter 101 includes an external environment identifier 111, a candidate route generator 112, a vehicle behavior estimator 113, an occupant behavior estimator 114, a route determiner 115, and a vehicle motion determiner 116. The external environment identifier 111 recognizes the environment outside the vehicle based on the outputs from the cameras 70, for example. The candidate route generator 112 calculates one or more candidate routes that can be traveled by the vehicle 1 in accordance with the environment outside the vehicle recognized by the external environment identifier 111. The vehicle behavior estimator 113 estimates the behavior of the vehicle based on the outputs from the vehicle condition sensor 73. The occupant behavior estimator 114 estimates the behavior of the occupant(s) of the vehicle based on the outputs from the occupant condition sensor 74. The route determiner 115 determines the route to be traveled by the vehicle 1. The vehicle motion determiner 116 determines the target motion of the vehicle for following the route set by the route determiner 115.

The arithmetic unit 100 has a power train controller (hereinafter referred to as PT controller) 117, a brake controller 118, and a steering controller 119 that calculate a control amount of the in-vehicle devices (for example, a fuel injection amount in an engine 20 and an actuator operation amount in a brake system 40) for achieving the target motion determined by the vehicle motion determiner 116. Further, the arithmetic unit 100 has a body-related device controller 140 that controls body-related devices (appropriately referred to as body-related devices 10).

Further, as a safety function, the arithmetic unit 100 has a rule-based route generator 120 that recognizes an object outside the vehicle in accordance with a predetermined rule and generates a traveling route that avoids the object, and a backup unit 130 that generates a traveling route for guiding the vehicle 1 to a safe area such as a road shoulder.

Further, in the present embodiment, the arithmetic unit 100 has a failure diagnostic function of diagnosing a failure of the vehicle. Specifically, the arithmetic unit 100 includes the device failure diagnostic unit 150 that is provided between the device controllers 117 to 119 and 140 and the in-vehicle devices in a communication path of the arithmetic unit 100 and diagnoses a failure of the in-vehicle devices, a sensor failure diagnostic unit 160 that is provided between the sensors 70 to 76 and the target motion setter such as the external environment identifier 111 in the communication path of the arithmetic unit 100 and diagnoses a failure of the sensors 70 to 76, and a memory section 170 that stores a diagnosis result of the device failure diagnostic unit 150 and a diagnosis result of the sensor failure diagnostic unit 160 in association with each function of the vehicle.

The external environment identifier 111, the candidate route generator 112, the vehicle behavior estimator 13, the occupant behavior estimator 114, the route determiner 115, the vehicle motion determiner 116, the PT controller 117, the brake controller 118, the steering controller 119, the rule-based route generator 120, the backup unit 130, the device failure diagnostic unit 150, the sensor failure diagnostic unit 160, and the memory section 170 are examples of modules stored in a memory 102.

<External Environment Identifier>

The external environment identifier 111 recognizes the exterior environment by receiving the output of the cameras 70, the radars 71, and the like mounted in the vehicle. The exterior environment to be recognized includes at least roads and obstacles. Here, the external environment identifier 111 infers the environment outside the vehicle including roads and obstacles by comparing three-dimensional information around the vehicle with an exterior environment model based on the data of the cameras 70 and the radars 71. The exterior environment model is, for example, a learned model generated by deep learning, and can recognize roads, obstacles, and the like in the three-dimensional information around the vehicle.

For example, the external environment identifier 111 identifies a free space, that is, an area where no object exists, by image processing from an image captured by the cameras 70. For the image processing here, for example, a learned model generated by deep learning is used. Then, a two-dimensional map that represents the free space is generated. In addition, the external environment identifier 111 acquires information on the target existing around the vehicle 1 from the output of the radars 71. This information is positioning information including a position and speed of the target. Then, the external environment identifier 111 combines the generated two-dimensional map with the positioning information of the target to generate a three-dimensional map representing the surroundings of the vehicle. Here, information on an installation position and an imaging direction of the cameras 70 and information on an installation position and a transmission direction of the radars 71 are used. The external environment identifier 111 infers the vehicle environment including roads and obstacles by comparing the generated three-dimensional map with the exterior environment model. Note that the deep learning uses a multilayer neural network (DNN: Deep Neural Network). The multilayer neural network may be a convolutional neural network (CNN), for example.

<Candidate Route Generator>

The candidate route generator 112 generates a candidate route on which the vehicle can travel based on the output of the external environment identifier 111, the output of the position sensor 72, the information transmitted from the external communicator 76, and the like. For example, the candidate route generator 112 generates a traveling route that avoids obstacles recognized by the external environment identifier 111 on a road recognized by the external environment identifier 111. The output from the vehicle external environment identifier 111 includes, for example, traveling road information related to a traveling road on which the vehicle 1 travels. The traveling road information includes information relating to the shape of the traveling road itself and information relating to objects on the traveling road. The information relating to the shape of the traveling road includes the shape of the traveling road (whether it is straight or curved, and the curvature), the width of the traveling road, the number of lanes, the width of each lane, and the like. The information on the object includes a relative position and a relative speed of the object with respect to the own vehicle, attributes (type and moving direction) of the object, and the like. Examples of the types of objects include other vehicles, pedestrians, roads, and lane markings.

Here, the candidate route generator 112 calculates the plurality of candidate routes using a state lattice method, and selects at least one candidate route from among these candidate routes based on a route cost of each candidate route. However, the route may be calculated by using another method.

The candidate route generator 112 sets a virtual grid area on the travel road based on the travel road information. This grid area has a plurality of grid points. Each grid point identifies a position on the travel road. The candidate route generator 112 sets a predetermined grid point at a target arrival position. Then, the plurality of candidate routes is calculated by a route search using the plurality of grid points in the grid area. In the state lattice method, the route branches from a certain grid point to an arbitrary grid point ahead in a traveling direction of the vehicle. Thus, each candidate route is set to sequentially pass through the plurality of grid points. Each candidate route also includes time information indicating time to pass each grid point, speed information related to speed and acceleration at each grid point, information on a vehicle motion, and the like.

The candidate route generator 112 selects at least one traveling route from the plurality of candidate routes based on the route cost. Examples of the route cost here include a degree of lane centering, the acceleration of the vehicle, a steering angle, and possibility of collision. When the candidate route generator 112 selects the plurality of traveling routes, the route determiner 115 selects one traveling route.

<Vehicle Behavior Estimator>

The vehicle behavior estimator 113 measures a status of the vehicle from the outputs of the sensors that detect the behavior of the vehicle, such as the vehicle speed sensor, the acceleration sensor, the yaw rate sensor, and wheel torque. The vehicle behavior estimator 113 uses a vehicle six-axis model that shows the behavior of the vehicle.

Here, the 6DoF model of the vehicle is obtained by modeling acceleration along three axes, namely, in the "forward/backward (surge)", "left/right (sway)", and "up/down (heave)" directions of the traveling vehicle, and the angular velocity along the three axes, namely, "pitch", "roll", and "yaw". That is, the 6DoF model 45 of the vehicle is a numerical model not grasping the vehicle motion only on the plane (the forward/backward and left/right directions (i.e., the movement along the X-Y plane), and the yawing (along the Z-axis)) according to the classical vehicle motion engineering but reproducing the behavior of the vehicle using six axes in total. The vehicle motions along the six axes further include the pitching (along the Y-axis), rolling (along the X-axis) and the movement along the Z-axis (i.e., the up/down motion) of the vehicle body mounted on the four wheels with the suspension interposed therebetween.

The vehicle status estimation unit 113 applies the 6DoF model of the vehicle to the traveling route generated by the candidate route generator 112 to estimate the behavior of the vehicle when following the traveling route.

<Occupant Behavior Estimator>

The occupant behavior estimator 114 particularly estimates the driver's health condition and emotion from the results of the detection of the occupant status sensor 74. Examples of the health condition include good health condition, slightly fatigue, poor health condition, decreased consciousness, and the like. Examples of the emotion include fun, normal, bored, annoyed, uncomfortable, and the like.

For example, the occupant status estimation unit 114 extracts a face image of the driver from an image taken by a camera installed inside the vehicle cabin, and identifies the driver. The extracted face image and information of the identified driver are provided as inputs to a human model. The human model is, for example, a learned model generated by deep learning, and outputs the health condition and the emotion of each person who may be the driver of the vehicle, from the face image. The occupant behavior estimator 114 outputs the health condition and the emotion of the driver output by the human model.

In addition, in a case of adopting a bio-information sensor such as a skin temperature sensor, a heartbeat sensor, a blood flow sensor, a perspiration sensor, and the like as the occupant status sensor 74 for acquiring information of the driver, the occupant status estimation unit 114 measures the bio-information of the driver from the output from the bio-information sensor. In this case, the human model uses the bio-information as inputs, and outputs the health conditions and the emotions of people who may be the driver of the vehicle. The occupant status estimation unit 114 outputs the health condition and the emotion of the driver output by the human model.

In addition, as the human model, a model that estimates an emotion of a human in response to the behavior of the vehicle may be used for each person who may be the driver of the vehicle. In this case, the model may be established by managing, in time sequence, the outputs of the vehicle behavior estimator 113, the bio-information on the driver, and the estimated emotional conditions. With this model, for example, it is possible to predict the relationship between changes in the driver's emotion (the degree of wakefulness) and the behavior of the vehicle.

In addition, the occupant status estimation unit 114 may include a human body model as the human model. The human body model specifies, for example, the weight of the head (e.g., 5 kg) and the strength of the muscles around the neck supporting against G-forces in the front, back, left, and right directions. The human body model outputs predicted physical and subjective properties of the occupant, when a motion (acceleration G-force or jerk) of the vehicle body is input. The physical property of the occupant is, for example, comfortable/moderate/uncomfortable, and the subjective property is, for example, unexpected/predictable. For example, a vehicle behavior that causes the head to lean backward even slightly is uncomfortable for an occupant. Therefore, a traveling route that causes the head to lean backward can be avoided by referring to the human body model. On the other hand, a vehicle behavior that causes the head of the occupant to lean forward in a bowing manner does not immediately lead to discomfort. This is because the occupant is easily able to resist such a force. Therefore, such a traveling route that causes the head to lean forward may be selected. Alternatively, a target motion can be dynamically determined by referring to the human body model, so that, for example, the head of the passenger does not swing or the head of the passenger stays active.

The occupant status estimation unit 114 applies a human model to the vehicle behavior estimated by the vehicle behavior estimator 113 to estimate a change in the health conditions or the emotion of the current driver with respect to the vehicle behavior.

<Route Determiner>

The route determiner 115 determines the route to be traveled by the vehicle, based on an output from the occupant status estimation unit 114. If only one route is generated by the candidate route generator 112, the route determiner 115 determines this route as the route to be traveled by the vehicle. If the candidate route generator 112 generates a plurality of routes, a route that an occupant (in particular, the driver) feels most comfortable with, that is, a route that the driver does not perceive as a redundant route, such as a route too cautiously avoiding an obstacle, is selected out of the plurality of candidate routes, in consideration of an output from the occupant status estimation unit 114.

<Rule-Based Route Generator>

The rule-based route generator 120 recognizes an object outside the vehicle in accordance with a predetermined rule based on outputs from the cameras 70 and radars 71, without use of deep learning, and generates a traveling route that avoids such an object. Similarly to the candidate route generator 112, it is assumed that the rule-based route generator 120 also calculates a plurality of candidate routes by means of the state lattice method, and selects one or more candidate routes from among these candidate routes based on a route cost of each candidate route. In the rule-based route generator 120, the route cost is calculated based on, for example, a rule of keeping away from a several meter range from the object. Another technique may be used for calculation of the route also in this rule-based route generator 120.

Information of a route generated by the rule-based route generator 120 is input to the vehicle motion determiner 116.

<Backup Unit>

The backup unit 130 generates a travel route for guiding the vehicle to a safe area, such as a road shoulder, based on outputs from the cameras 70 and the radars 71 at a malfunction of a sensor, for example, or if an occupant is not feeling well. For example, from the information given by the position sensor 72, the backup unit 130 sets a safety area in which the vehicle can be stopped in case of emergency, and generates a traveling route to reach the safety area. Similarly to the candidate route generator 112, it is assumed that the backup unit 130 also calculates a plurality of candidate routes by means of the state lattice method, and selects one or more candidate routes from among these candidate routes based on a route cost of each candidate route. Another technique may be used for calculation of the route also in this backup unit 130.

Information of a route generated by the backup unit 130 is input to the vehicle motion determiner 116.

<Vehicle Motion Determiner>

The vehicle motion determiner 116 determines a target motion on a traveling route determined by the route determiner 115. The target motion means steering and acceleration/deceleration to follow the traveling route. In addition, with reference to the 6DoF model of the vehicle, the vehicle motion determiner 116 calculates the motion of the vehicle on the traveling route selected by the route determiner 115.

The vehicle motion determiner 116 determines the target motion to follow the traveling route generated by the rule-based route generator 120.

The vehicle motion determiner 116 determines the target motion to follow the traveling route generated by the backup unit 130.

When the traveling route determined by the route determiner 115 significantly deviates, when compared to a traveling route generated by the rule-based route generator 120, the vehicle motion determiner 116 selects the traveling route generated by the rule-based route generator 120 as the route to be traveled by the vehicle 1.

In an occasion of failure of sensors and the like (in particular, cameras 70 or radars 71) or in a case where the passenger is not feeling well, the vehicle motion determiner 116 selects the traveling route generated by the backup unit 130 as the route to be traveled by the vehicle.

<Device Controller>

The device controller includes the PT controller 117, the brake controller 118, the steering controller 119, and the body-related device controller 140.

The PT controller 117 calculates a control amount of the engine 20 and the transmission 30, and outputs control signals to the engine 20 and the transmission 30. Specifically, the PT controller 117 sets the fuel injection amount and fuel injection timing of an injector of the engine 20, ignition timing of a spark plug of the engine 20, and the like based on the output of the vehicle motion determiner 116, and generates the control signal for controlling the engine 20 based on the setting. The PT controller 117 outputs the generated control signal to the injector, a throttle valve, and the like of the engine 20. Further, the PT controller 117 sets a gear stage of the transmission 30 based on the output of the vehicle motion determiner 116, and outputs a control signal for controlling the transmission 30 in accordance with the setting. The PT controller 117 outputs the generated control signal to the transmission 30. The brake controller 118 sets the operations of the brake actuator of the brake system 40 based on the outputs of the vehicle motion determiner 116, and generates control signals for controlling the brake actuator in accordance with the settings. The brake controller 118 outputs the generated control signals to the brake system 40. The steering controller 119 sets the operations of the electric power steering of the steering system 50 based on the outputs of the vehicle motion determiner 116, and generates control signals for controlling the electric power steering in accordance with the settings. The steering controller 119 outputs the generated control signals to the steering system 50. That is, the body-related device controller 140 sets operations of the body-related devices 10 of the vehicle such as a lamp and a door, based on outputs from the vehicle motion determiner 116, and generates a control signal that controls the body-related devices 10. The generated control signal is transmitted to the body-related devices 10.

Note that the in-vehicle devices 10 to 50 shown here are examples, and a device mounted in a vehicle is included in the in-vehicle devices. A large number of in-vehicle devices such as the injector and the throttle valve may be included, as in the engine 20.

<Device Failure Diagnostic Unit>

As shown in FIG. 2, the device failure diagnostic unit 150 is provided between the device controllers 117 to 119 and 140 and the in-vehicle devices 10 to 50 in the communication path of the arithmetic unit 100. Thus, all the control signals output from the device controller 117 to 119 and 140 to the in-vehicle devices are input to the device failure diagnostic unit 150.

The device failure diagnostic unit 150 has a device diagnostic table 151 as shown in FIG. 3. In the device diagnostic table 151, the in-vehicle devices associated with each function are specified for each function of the vehicle. For example, in the device diagnostic table 151 shown in FIG. 3, the in-vehicle devices related to a rotation of the engine 20 (rotation of a crankshaft) are specified. The in-vehicle devices shown in FIG. 3 are examples, and do not show all the in-vehicle devices related to the rotation of the engine 20.

The device failure diagnostic unit 150 diagnoses the failure status of each of the in-vehicle devices 10 to 50 based on each control signal output by the device controllers 117 to 119 and 140 and an actual output value of each in-vehicle device. As shown in FIG. 2, the control signals output by the device controllers 117 to 119 and 140 are input to the device failure diagnostic unit 150. The device failure diagnostic unit 150 stores content of the control signals, particularly an expected value of the output (actuator operating time and the like) of each in-vehicle device. At this time, the device failure diagnostic unit 150 stores the expected value of the in-vehicle devices related to the control content to be executed based on the device diagnostic table 151. Then, the device failure diagnostic unit 150 acquires the actual output of the in-vehicle devices and compares the output with the stored expected value. When the deviation between the actual output of the in-vehicle devices and the stored expected value is equal to or greater than a predetermined amount, the device failure diagnostic unit 150 determines that the in-vehicle devices have an abnormality (failure).

For example, when the engine 20 is rotated, the device failure diagnostic unit 150 stores the operating time of the injector, the ignition timing of the spark plug, the opening degree of the throttle valve, and the like by input from the PT controller 117. Then, the expected value of each in-vehicle device is compared with the actual output of each in-vehicle device to identify the in-vehicle device having an abnormality.

A device failure code (simply shown as a code in FIG. 3) is attached to the device diagnostic table 151 for each combination of a normal in-vehicle device and an abnormal in-vehicle device. The device failure diagnostic unit 150 identifies the device failure code from the diagnosis result and outputs the device failure code to the memory section 170.

<Sensor Failure Diagnostic Unit>

As shown in FIG. 2, the sensor failure diagnostic unit 160 is provided between the sensors 70 to 76 and the target motion setter 101 in the communication path of the arithmetic unit 100. Therefore, the sensor failure diagnostic unit 160 can receive all the signals output from the sensors 70 to 76 that transmit the detection signal to the target motion setter 101.

The sensor failure diagnostic unit 160 has a sensor diagnostic table 161 as shown in FIG. 4. In this sensor diagnostic table 161, the sensors associated with each function are specified for each function of the vehicle. For example, in the sensor diagnostic table 161 shown in FIG. 3, the sensors related to the rotation of the engine 20 are specified. The sensors shown in FIG. 4 are examples, and do not show all the sensors related to the rotation of the engine 20.

The sensor failure diagnostic unit 160 diagnoses the failure status of each of the sensors 70 to 76 based on the signals input from the sensors 70 to 76. Specifically, the sensors 70 to 76 have a self-check function, and the sensors 70 to 76 input check results by the self-check function to the sensor failure diagnostic unit 160 together with measured values. The sensor failure diagnostic unit 160 diagnoses the failure status of each of the sensors 70 to 76 based on the input check results. Further, the sensor failure diagnostic unit 160 is configured to be able to output control signals instructing the sensors 70 to 76 to perform a self-check.

A sensor failure code (simply shown as a code in FIG. 4) is attached to the sensor diagnostic table 161 for each combination of a normal sensor and an abnormal (failed) sensor. The sensor failure diagnostic unit 160 identifies the sensor failure code from the diagnosis result and outputs the sensor failure code to the memory section 170.

<Memory Section>

The memory section 170 stores the diagnosis result of the device failure diagnostic unit 150 and the diagnosis result of the sensor failure diagnostic unit 160 in association with each function of the vehicle. Specifically, the device failure code output from the device failure diagnostic unit 150 and the sensor failure code output from the sensor failure diagnostic unit 160 are stored in association with each function of the vehicle and time.

For example, the memory section 170 can store a table in which the device failure code and the sensor failure code are combined for each function. As a result, the memory section 170 can associate the device failure code with the sensor failure code based on the table. Further, the memory section 170 can be provided with a function of adding a time stamp to the device failure code and the sensor failure code. As a result, the memory section 170 can store the device failure code and the sensor failure code, which are input at the same time or at close times, temporally in association with each other. Note that the device failure diagnostic unit 150 and the sensor failure diagnostic unit 160 may be provided with a function of adding a time stamp to the device failure code and the sensor failure code, respectively.

When an event that seems to be a failure occurs in the vehicle, this function makes it easy to identify a cause of the event. For example, suppose that an event occurs in which an accelerator pedal is depressed but engine speed does not increase. Suppose that at the time when this event occurs, the device failure diagnostic unit 150 has output the device failure code (code D1 in FIG. 3) indicating a failure of the throttle valve, while the sensor failure diagnostic unit 160 has not output the sensor failure code (code A2 or A3 in FIG. 4) indicating a failure of an accelerator position sensor. As a result, by reading the codes stored in the memory section 170, an operator such as a dealer who recognizes a vehicle failure can find a cause that the engine speed has not increased due to a failure of the throttle valve about the event in which the accelerator pedal is depressed but the engine speed does not increase.

In addition, for example, suppose that an event occurs in which a door is locked but the door opens. Suppose that at the time when this event occurs, the device failure diagnostic unit 150 has not output the device failure code indicating a failure of a door lock actuator, while the sensor failure diagnostic unit 160 has output the sensor failure code indicating a failure of a door switch. As a result, the operator such as a dealer who recognizes a vehicle failure can find a cause that the door lock actuator did not operate due to the failure of the door switch about the event in which the door is locked but the door opens.

Here, in the present embodiment, the memory section 170 is configured to further store the target motion of the vehicle set by the target motion setter 101 in association with the diagnosis result of the device failure diagnostic unit 150 and the diagnosis result of the sensor failure diagnostic unit 160. More specifically, the memory section 170 stores the traveling route determined by the route determiner 115 and the motion of the vehicle determined by the vehicle motion determiner 116 in association with the diagnosis result of the device failure diagnostic unit 150 and the diagnosis result of the sensor failure diagnostic unit 160.

For example, suppose that an event occurs in which the steering device 50 is operated, but yaw acceleration is not generated. Suppose that at the time when this event occurs, the device failure code indicating a failure of the related in-vehicle device (steering device 50 or the like) from the device failure diagnostic unit 150 has not been input, and the sensor failure code indicating a failure of the related sensor (steering angle sensor or the like) from the sensor failure diagnostic unit 160 has not been input. On the other hand, suppose that the memory section 170 has output information that there is a frozen road surface on the traveling route to the target motion setter 101. As a result, the operator such as a dealer who recognizes a failure of the vehicle can find a cause that the in-vehicle device or the sensor have not failed but the vehicle has been driving on a frozen road surface about the event in which the steering device 50 is operated but the yaw acceleration is not generated. In this way, the operator can easily recognize that the vehicle has not failed, and can easily recognize the cause of the event that seems to be the failure of the vehicle.

Thus, the present embodiment includes a plurality of sensors 70 to 76 that inputs vehicle information including an exterior environment of the vehicle to the arithmetic unit 100, a target motion setter 101 that is provided in the arithmetic unit 100 and sets a target motion of the vehicle based on the information input by the plurality of sensors 70 to 76, device controllers 117 to 119 and 140 that are provided in the arithmetic unit 100 and output a control signal to each of the in-vehicle devices 10 to 50 based on the target motion set by the target motion setter 101, and a device failure diagnostic unit 150 that is provided between the device controllers 117 to 119 and 140 and the in-vehicle devices 10 to 50 in a communication path of the arithmetic unit 100 and diagnoses a failure of the in-vehicle devices 10 to 50, in which the device failure diagnostic unit 150 has a device diagnostic table 151 in which the in-vehicle devices 10 to 50 associated with each function are specified for each function of the vehicle, and diagnoses a failure of the in-vehicle devices 10 to 50 based on output of the in-vehicle devices 10 to 50 and the device diagnostic table (for example, the device diagnostic table 151 in FIG. 3). That is, the device failure diagnostic unit 150, which receives outputs from the device controllers 117 to 119 and 140 that control the in-vehicle devices, can diagnose the failure of the in-vehicle devices in consideration of association of the in-vehicle devices. Then, the device failure diagnostic unit 150 has a device diagnostic table in which the in-vehicle devices associated with the functions are specified for each function of the vehicle, and thus when an event that seems to be a failure occurs in the vehicle, the device failure diagnostic unit 150 can find a status of the in-vehicle devices associated with the event. This makes it easy to find a cause of an event that seems to be a vehicle failure.

Further, the present embodiment further includes a sensor failure diagnostic unit 160 that is provided between the plurality of sensors 70 to 76 and the target motion setter 101 in the communication path of the arithmetic unit 100 and diagnoses a failure of the plurality of sensors 70 to 76, in which the sensor failure diagnostic unit 160 has a sensor diagnostic table (for example, the sensor diagnostic table 161 in FIG. 4) in which the plurality of sensors 70 to 76 associated with each function is specified for each function of the vehicle, and diagnoses the failure of the plurality of sensors 70 to 76 based on the sensor diagnostic table. As a result, when an event that seems to be a failure occurs in the vehicle, it is easy to identify a cause of the event even if the failure is not in an in-vehicle device but a sensor. This makes it easy to find a cause of an event that seems to be a vehicle failure.

Further, the present embodiment further includes the memory section 170 that stores the diagnosis result of the device failure diagnostic unit 150 and the diagnosis result of the sensor failure diagnostic unit 160 in association with each function of the vehicle. As a result, it is possible to diagnose the failure of the vehicle after finding the combination of the in-vehicle device and the sensor associated with the function of the vehicle. This makes it easy to find a cause of an event that seems to be a vehicle failure.

In particular, in the present embodiment, the memory section 170 stores the traveling route of the vehicle determined by the route determiner 115 and the motion of the vehicle determined by the vehicle motion determiner 116 in association with the diagnosis result of the device failure diagnostic unit 150 and the diagnosis result of the sensor failure diagnostic unit 160. As a result, a road surface condition of the traveling route (for example, the road surface is frozen) and the motion of the vehicle on the road surface condition are considered, and then it can be understood that the problem is not a failure of the in-vehicle devices or the sensors but the road surface condition. This makes it easy to find a cause of an event that seems to be a vehicle failure.

The present disclosure is not limited to the embodiment described above, and may be modified within the scope of the claims.

For example, the device failure diagnostic unit 150 may diagnose the failure of the in-vehicle devices by further considering the traveling route of the vehicle determined by the route determiner 115 and the motion of the vehicle determined by the vehicle motion determiner 116. At this time, for example, it is sufficient that items indicating the road surface condition (presence or absence of freezing, unevenness, and the like) and the motion of the vehicle (turning a curve and the like) are added to the device diagnostic table, and the device failure code is added for each road surface condition and each motion of the vehicle.

Further, the memory section 170 is provided in the above embodiment, but the present invention is not limited to this, and the memory section 170 may be omitted. In this case, for example, the device failure diagnostic unit 150 and the sensor failure diagnostic unit 160 are provided with a function of storing the device failure code and the sensor failure code, respectively, and the dealer or the like can read the failure codes from the respective failure diagnostic units 150 and 160.

Further, in the above embodiment, the target motion setter 101 of the arithmetic unit 100 enables autonomous driving and assisted driving. The present disclosure is not limited to this. If the target motion setter 101 sets the target motion of the vehicle based on the information input by the sensors 70 to 76, the arithmetic unit 100 does not have to have an autonomous driving function or an assisted driving function.

The embodiment described above is merely an example in nature, and the scope of the present disclosure should not be interpreted in a limited manner. The scope of the present disclosure is defined by the appended claims, and all variations and modifications belonging to a range equivalent to the range of the claims are within the scope of the present disclosure.

INDUSTRIAL APPLICABILITY

The technology disclosed herein is useful as the vehicle failure diagnostic device including the arithmetic unit configured to perform the calculation for controlling the in-vehicle devices mounted in the vehicle.

DESCRIPTION OF REFERENCE CHARACTERS

10 Body-related Device
20 Engine
30 Transmission
40 Brake Device
50 Steering Device
70 Camera (Sensor)
71 Radar (Sensor)
72 Position Sensor
73 Vehicle Status Sensor
74 Occupant Status Sensor
75 Switches (Sensors)
76 External Communicator (Sensor)
100 Arithmetic Unit
101 Target motion setter
115 Route determiner
116 Vehicle motion determiner
117 PT controller
118 Brake controller
119 Steering controller
140 Body Device controller
150 Device Failure Diagnostic Unit
151 Device Diagnostic Table
160 Sensor Failure Diagnostic Unit
161 Sensor Diagnostic Table
170 Memory Section

The invention claimed is:

1. A vehicle failure diagnostic device comprising:
an arithmetic unit configured to perform a calculation for controlling in-vehicle devices mounted in a vehicle;
a plurality of sensors configured to input vehicle information including an exterior environment of the vehicle to the arithmetic unit;
a target motion setter provided in the arithmetic unit and configured to set a target motion of the vehicle based on the information input by the plurality of the sensors;

a device controller provided in the arithmetic unit and configured to output a control signal to each of the in-vehicle devices based on the target motion set by the target motion setter; and a device failure diagnostic unit provided between the device controller and the in-vehicle devices in a communication path of the arithmetic unit and configured to diagnose a failure of each of the in-vehicle devices, the device failure diagnostic unit having a device diagnostic table in which the in-vehicle devices associated with each function are specified for each function of the vehicle, and diagnosing the failure of the in-vehicle devices based on output of the in-vehicle devices and the device diagnostic table.

2. The vehicle failure diagnostic device of claim 1, wherein the target motion setter has a route determiner that determines a traveling route on which the vehicle is to travel based on output of the plurality of sensors, a vehicle motion determiner that determines a motion of the vehicle for following the traveling route calculated by the route determiner, and the device failure diagnostic unit diagnoses the failure of the in-vehicle devices by further considering the traveling route determined by the route determiner and the motion of the vehicle determined by the vehicle motion determiner.

3. The vehicle failure diagnostic device of claim 2, further comprising a sensor failure diagnostic unit provided between the plurality of sensors and the target motion setter in the communication path of the arithmetic unit and configured to diagnose a failure of the plurality of sensors, wherein the sensor failure diagnostic unit has a sensor diagnostic table in which the plurality of sensors associated with each function is specified for each function of the vehicle, and diagnoses the failure of the plurality of sensors based on the sensor diagnostic table.

4. The vehicle failure diagnostic device of claim 3, further comprising a memory section configured to store a diagnosis result of the device failure diagnostic unit and a diagnosis result of the sensor failure diagnostic unit in association with each function of the vehicle.

5. The vehicle failure diagnostic device of claim 4, wherein the target motion setter has a route determiner that determines a traveling route on which the vehicle is to travel based on output of the plurality of sensors, and a vehicle motion determiner that determines a motion of the vehicle for following the traveling route calculated by the route determiner, and the memory section stores the traveling route determined by the route determiner and the motion of the vehicle determined by the vehicle motion determiner in association with the diagnosis result of the device failure diagnostic unit and the diagnosis result of the sensor failure diagnostic unit.

6. The vehicle failure diagnostic device of claim 1, further comprising a sensor failure diagnostic unit provided between the plurality of sensors and the target motion setter in the communication path of the arithmetic unit and configured to diagnose a failure of the plurality of sensors, wherein the sensor failure diagnostic unit has a sensor diagnostic table in which the plurality of sensors associated with each function is specified for each function of the vehicle, and diagnoses the failure of the plurality of sensors based on the sensor diagnostic table.

7. The vehicle failure diagnostic device of claim 6, further comprising a memory section configured to store a diagnosis result of the device failure diagnostic unit and a diagnosis result of the sensor failure diagnostic unit in association with each function of the vehicle.

8. The vehicle failure diagnostic device of claim 7, wherein the target motion setter has a route determiner that determines a traveling route on which the vehicle is to travel based on output of the plurality of sensors, and a vehicle motion determiner that determines a motion of the vehicle for following the traveling route calculated by the route determiner, and the memory section stores the traveling route determined by the route determiner and the motion of the vehicle determined by the vehicle motion determiner in association with the diagnosis result of the device failure diagnostic unit and the diagnosis result of the sensor failure diagnostic unit.

\* \* \* \* \*